Figure 6:
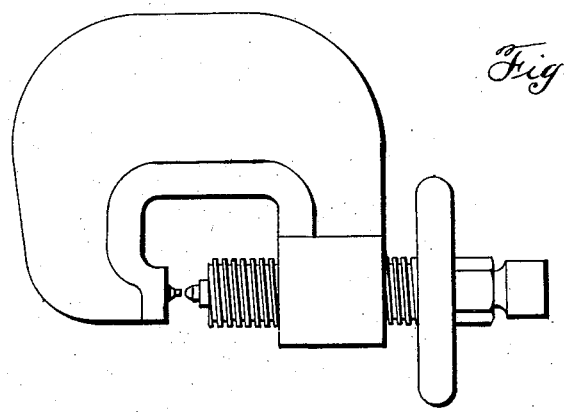

No. 699,060. Patented Apr. 29, 1902.
F. B. BADT & G. M. WILLIS.
RAIL BOND.
(Application filed Dec. 2, 1901.)
(No Model.) 2 Sheets—Sheet 1.
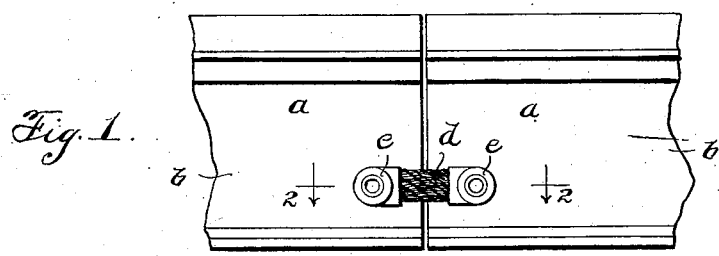
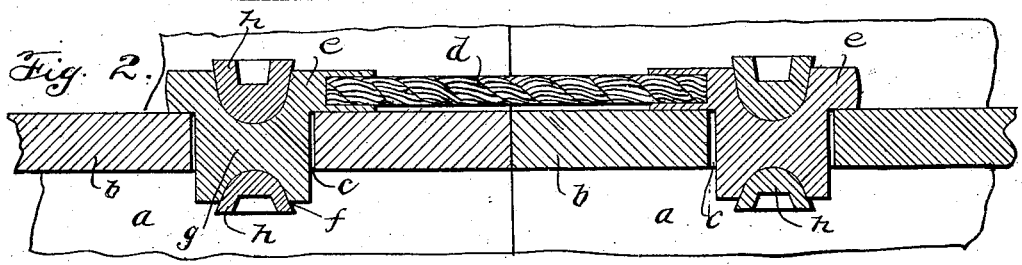
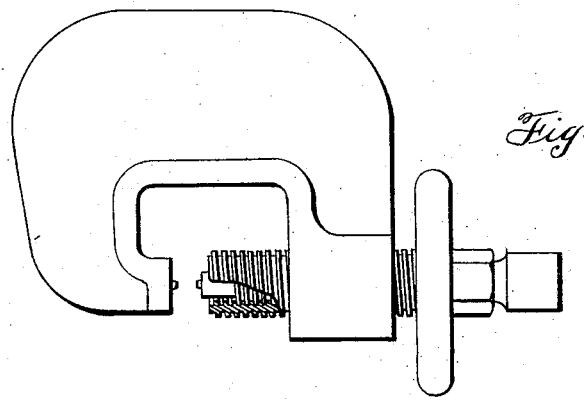
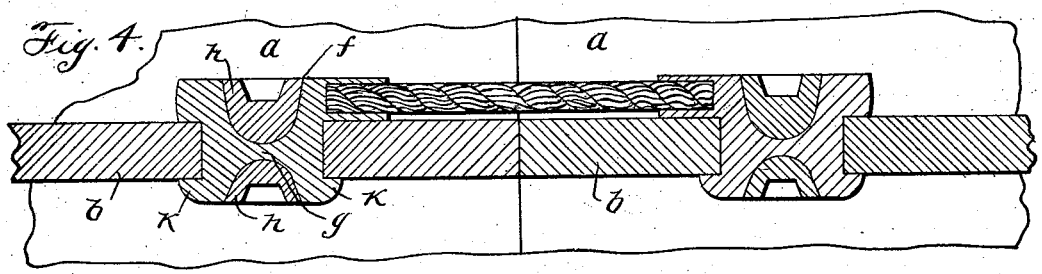
Witnesses:
Inventors:
Francis B. Badt,
George M. Willis,
By Charles A. Brown, Cragg & Byfield
Attorneys.

No. 699,060. Patented Apr. 29, 1902.
F. B. BADT & G. M. WILLIS.
RAIL BOND.
(Application filed Dec. 2, 1901.)
(No Model.) 2 Sheets—Sheet 2.

Witnesses:
Max W. Zabel.
Herbert F. Bangfell.

Inventors
Francis B. Badt,
George M. Willis,
By Charles A. Brown, Cragg & Belfield
Attorneys.

UNITED STATES PATENT OFFICE.

FRANCIS B. BADT AND GEORGE M. WILLIS, OF CHICAGO, ILLINOIS.

RAIL-BOND.

SPECIFICATION forming part of Letters Patent No. 699,060, dated April 29, 1902.

Application filed December 2, 1901. Serial No. 84,371. (No model.)

*To all whom it may concern:*

Be it known that we, FRANCIS B. BADT and GEORGE M. WILLIS, citizens of the United States, residing at Chicago, in the county of Cook and State of Illinois, have invented a certain new and useful Improvement in Rail-Bonds, (Case No. 1,) of which the following is a full, clear, concise, and exact description, reference being had to the accompanying drawings, forming a part of this specification.

Our invention relates to bonds for conductors, and is of particular service in electric-railway practice wherein contiguous rails are to be electrically united; but it is not to be limited to this use.

It is the object of our invention to provide a union between adjacent rails that will be very efficient and not liable to deterioration.

In order to make the bond efficient, we construct the same with terminals which may be expanded within holes provided in abutting ends of alined rails. In order that the bond may be durable, we preferably make the terminals thereof of a homogeneous metal. To more effectively secure good connection between the terminals of the bond and the metal of the joining rails, we provide the terminals with recesses extending transversely of the rails and only partially through the terminals to retain webs that are preferably in the same plane with the webs of the rails, so that in the process of completing the bond or electrical joint between the rails a sufficient amount of the bonding metal will be retained to effectively fill the holes in the rails through which the bonding-terminals have been inserted, leaving a sufficient residue to maintain the metal of the terminals in compression, thus acting as a compression-head, so to speak. On this account the web is entirely or substantially imperforate.

In practice the webs in the terminals of the bond are of such thickness that sufficient metal may be pressed therefrom by a suitable bonding-tool to tightly plug the holes in the rails and yet leave enough metal to maintain the compression and afford a conductor of sufficient size to carry the current. It has been proposed to provide the terminals of rail-bonds with apertures extending entirely through the same and inserting or providing within these apertures pins of steel which in themselves are capable of expansion, the purpose being to force the metal of the bond-terminals surrounding the expanding-pins against the walls of the holes. It is obvious that there are many objections in practice to this form of rail-bond. In the first place the expanding-pins in order that they may perform the function ascribed to them are usually of low-grade steel. Two principal objections may be stated against steel pins used in this manner. There are in a bond thus completed two very distinct metals, which give rise to electrolytic action that impairs the efficiency of the bond. The second objection is due to the fact that the holes in the rails are of non-uniform size, while the expanding-pins are capable of expanding only to a limited and practically uniform extent, so that the metal of the terminals interposed between the expanding-pins and the walls of the holes is not compressed in the various joints of the system with a uniform degree of compression, and, in fact, the mechanical connections between the terminals and the rails are in many of the joints likely to become loose, especially when rail-bonds of certain types are employed. There are other types of rail-bonds wherein intimate mechanical and electrical union between the terminals and the rails is sought with even less effective result.

In the preferred practice of our invention we employ two recesses in each terminal, which are separated by a web. Devices may be contained within these recesses for the purpose of engaging the webs to expand the same, and thereby enlarge the portions of the terminals that are directly surrounded by the webs of the rails or other portions of the rails within which the bond-terminals are inserted. The devices that are inserted within the recesses may in one form of the invention be structurally distinct from the terminals of the bonds and, in fact, may constitute suitably-shaped tools or plugs mounted upon or rather constituting the jaws of a compressor. We prefer, however, to employ plugging devices that are mechanically integral with the terminals, but which are harder than the terminals of the bond. The plugs of the preferred form may be desirably made of phosphor-bronze or other material that is as similar to copper as possible, yet which will have the required degree of hardness, so that when the plugs are moved toward each other and against the interposed web of copper they will force the metal of this interposed web laterally toward the metal of the rail surrounding the same. By providing the plugging devices that are adapted to force the metal of the webs laterally it is obvious that the degree of lateral expansion to which the terminals may be subject is only limited by the thickness of the web, which, as before stated, should be such as to adapt the bond to holes in the rails that may vary in diameter and yet which will leave sufficient metal in the webs after they have been compressed to maintain the lateral stress and maintain terminals of suitably large cross-section. By forming the plugging devices of metal that is integral with the metal of the bond the conductivity of the terminal is increased. We prefer to rely upon the compression to which the webs may be subject to secure the desired union between the bond-terminals and the rails. For the purpose of heading the bond-terminals the recesses in the free ends of the terminals may have pressure exerted against their side walls to cause a lateral flow of the metal at the free ends of the terminals to spread the same beyond the borders of the holes in the rails to prevent these terminals from being withdrawn, so that the webs in the terminals may be restricted to the single function of filling the holes in the rails and maintaining tight engagement laterally between the terminals and the rails.

In our application, Serial No. 97,499, filed March 10, 1902, we have claimed an improved method for securing bond-terminals in place, which method is peculiarly adapted to the class of bond-terminals herein illustrated.

We will explain our invention more fully by reference to the accompanying drawings, in which—

Figure 7:
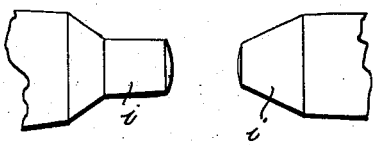
Figure 5:
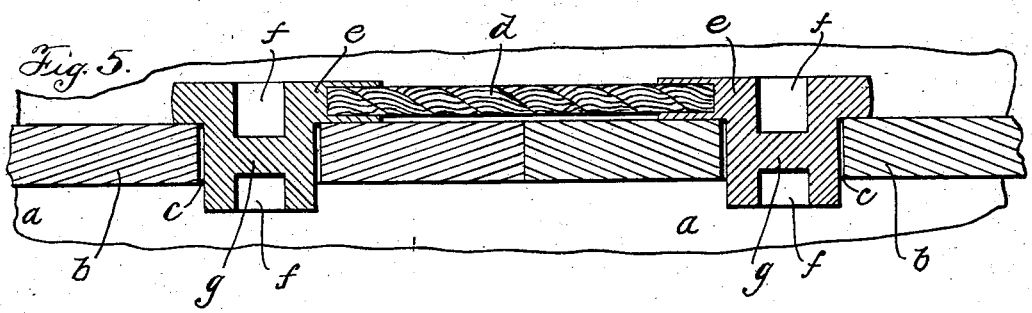
Figure 8:
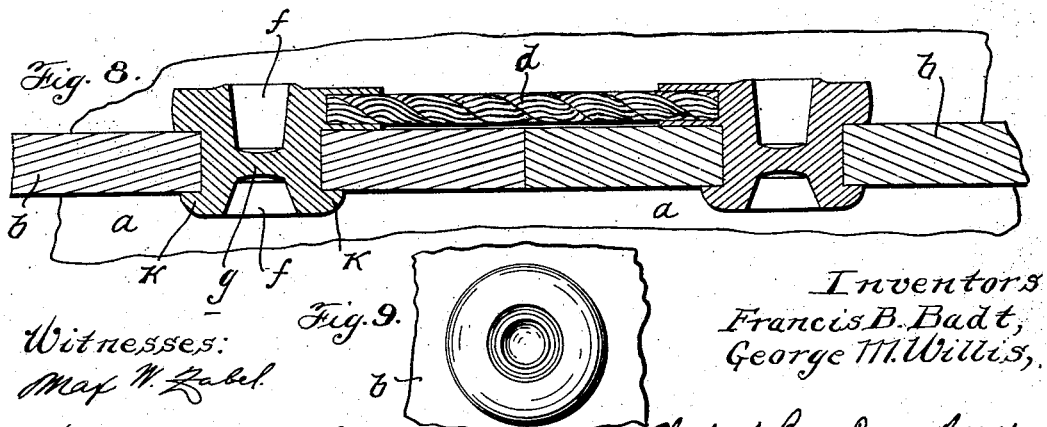
Figure 9:
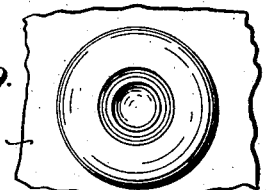

Figure 1 illustrates generally two rails bonded by means of a device of our invention. Fig. 2 is a sectional view on line 2 2 of Fig. 1, illustrating more clearly the preferred embodiment of the invention. Fig. 3 illustrates a compressor for completing the bond. Fig. 4 is a view similar to Fig. 2, the compressor having been employed, however, to complete the electrical connection between the bond and the adjacent rails. Fig. 5 is a sectional plan view of a modified form of rail-bond. Fig. 6 illustrates a compressor adapted to unite this form of rail-bond with the rails. Fig. 7 illustrates in detail the plugging devices with which the device of Fig. 6 may be equipped. Fig. 8 illustrates the bond of Fig. 5 after it has been subjected to the action of the compressor to complete its connection with the rails. Fig. 9 is an end view of one of the terminals of the bond shown in Fig. 8.

Like parts are indicated by similar characters of reference throughout the different figures.

The structural parts that are to be electrically united are in the drawings shown to be the rails $a\ a$, that may be used in an electric-railway system. Suitable portions of the structural parts $a\ a$—as, for example, the webs $b\ b$—may be provided with holes $c\ c$, that are preferably caused to extend entirely through the same. These holes may be of any suitable shape. We have illustrated holes each of which is of uniform diameter; but we do not wish to be limited to holes of this character.

The bond may have a link or yoke $d$, preferably in the form of a bond wire or cable, such as illustrated most clearly in Fig. 1, which unites the terminals or terminal lugs $e\ e$, the holes $c\ c$ in the adjacent rails being spaced apart a distance equal to the distance separating the said lugs and preferably being slightly larger than the lugs, so that the lugs may be readily inserted therein. The lugs or terminals $e\ e$ are preferably provided each with two recesses $f\ f$ in alinement, between which intervenes a web $g$, preferably of the same metal as the balance of the lug. These recesses preferably permanently contain plugs $h\ h$, about which the copper of the terminal lug is cast. This construction is illustrated in Figs. 2 and 4.

In Figs. 6 to 8, inclusive, we have illustrated plugs $i\ i$, that are adapted for reception within the recesses $f\ f$ only when the joint is being completed. A third way of completing the joints might consist in employing plugs similar to plugs $h\ h$ of Figs. 1 and 4, but having them not integrally formed with the lugs, in which case the plugs $h\ h$ would then merely serve the function of a tool, which having effected the lateral distention of the lugs may thereafter be removed. We prefer, however, the construction wherein plugs $h\ h$ are integrally formed with the terminal lugs of the bond for reasons which have been stated.

In Figs. 2 and 5 we have shown rail-bonds which span the gap between adjacent alined rails, the bases of the terminal lugs being united by the link or yoke $d$, while the free ends of the terminal lugs are unheaded. In these views the thickness of the webs $g$ will be observed. In Figs. 4 and 8 the thickness of these webs $g$ has been reduced, more of the metal thereof having been laterally spread to thicken the terminals or lugs $e\ e$ where they pass through the holes $c\ c$ to form firm mechanical union and good electrical connection between the metal sections $a\ a$ and the rail-bond. While the recesses at the bases of the terminal lugs are slightly flaring, this is only for the purpose of enabling the plugging-tool that enters the same to be readily withdrawn. The recesses at the opposite ends of the terminal lugs are preferably more widely flared, so that the metal at the extreme ends may be spread laterally to form heads $k$, the metal portions $a\ a$ being thus confined between the heads $k$ and the bases of the terminal lugs.

We have not deemed a detailed description of the compressing device to be essential, as such devices are well known to those skilled in the art. Other means may also be employed, it is obvious, to effect compression within the terminal lugs.

While we have shown terminal lugs each with two recesses, we do not wish to be limited in all embodiments of our invention to such a structural characteristic.

It will be observed that the webs in the terminals lie in substantially the same plane with the metal parts that are electrically bonded.

It is obvious that changes may be made from the embodiment of the invention herein shown without departing from its spirit, and we do not, therefore, wish to be limited to the precise details of construction set forth; but,

Having thus described our invention, we claim as new and desire to secure by Letters Patent—

1. A bond having a centrally-recessed terminal provided with a web, adapted to be spread to expand the terminal into firm engagement with the surrounding metal, and a device within the recess adapted to be forced against the web, substantially as described.

2. A bond having a terminal with opposite central recesses separated by a web, substantially as described.

3. A bond having a terminal centrally recessed on both sides and provided with a web, adapted to be spread to expand the terminal into firm engagement with surrounding metal, and a device within each recess adapted to be forced against the web, substantially as described.

4. A bond having a terminal with a recess extending partially therethrough and a web, in combination with a plugging device for entry within the recess to engage the web to expand the metal of the web laterally to bring the terminal into firm connection with surrounding metal, the said plugging device being integral with the terminal, substantially as described.

5. A bond having a terminal with recesses on opposite sides of the terminal, and a web interposed between the recesses, in combination with plugging devices for entry within the recesses to engage the web and thereby effect lateral distention thereof to bring the bond-terminal into firm mechanical and electrical connection with the metal surrounding the terminal, substantially as described.

6. A bond having a terminal with recesses on opposite sides of the terminal, and a web interposed between the recesses, in combination with plugging devices for entry within the recesses to engage the web and thereby effect lateral distention thereof to bring the bond-terminal into firm mechanical and electrical connection with the metal surrounding the terminal, the said plugging devices being integral with the terminal, substantially as described.

7. A bond having a centrally-recessed terminal provided with a web, adapted to be spread to expand the terminal into firm engagement with surrounding metal, and a device within the recess adapted to be forced against the web, the web being formed in one piece with the terminal, substantially as described.

8. A bond having a terminal with opposite central recesses separated by a web formed in one piece with the terminal, substantially as described.

9. A bond having a terminal with a recess extending partially therethrough and a web, in combination with a plugging device for entry within the recess to engage the web to expand the metal of the web laterally to bring the terminal into firm connection with surrounding metal, said web being formed in one piece with the terminal, substantially as described.

10. A bond having a terminal with a recess extending partially therethrough and a web, in combination with a plugging device for entry within the recess to engage the web to expand the metal of the web laterally to bring the terminal into firm connection with surrounding metal, the said plugging device being integral with the terminal, said web being formed in one piece with the terminal, substantially as described.

11. A bond having a terminal with recesses on opposite sides of the terminal, and a web interposed between the recesses, in combination with plugging devices for entry within the recesses to engage the web and thereby effect lateral distention thereof to bring the bond-terminal into firm mechanical and electrical connection with the metal surrounding the terminal, the said plugging devices being integral with the terminal, said web being formed in one piece with the terminal, substantially as described.

In witness whereof we hereunto subscribe our names this 30th day of November, A. D. 1901.

FRANCIS B. BADT.
GEORGE M. WILLIS.

Witnesses:
GEORGE L. CRAGG,
HARVEY L. HANSON.